April 15, 1930.  E. SCHULTZ  1,754,576
CASTER
Filed Sept. 14, 1928
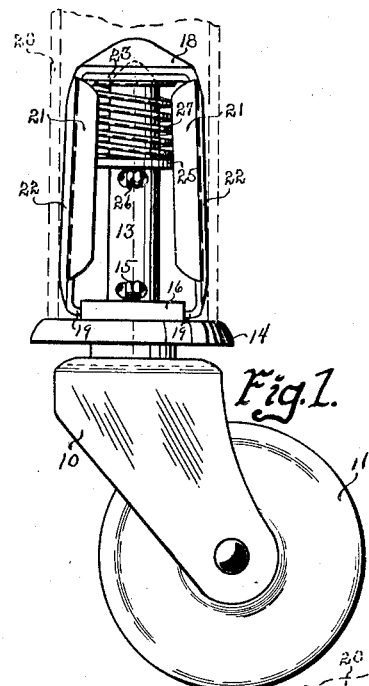
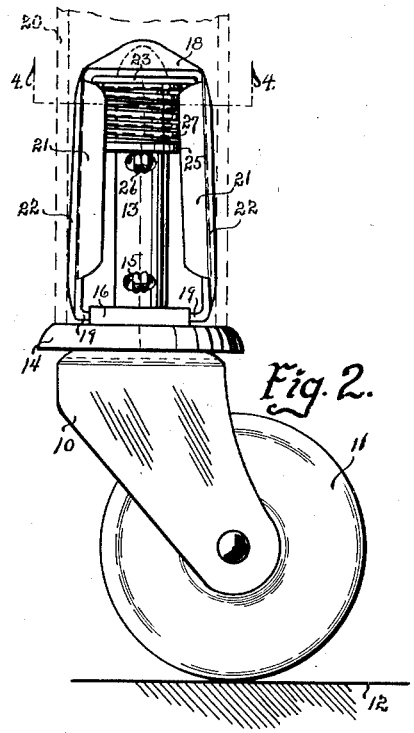
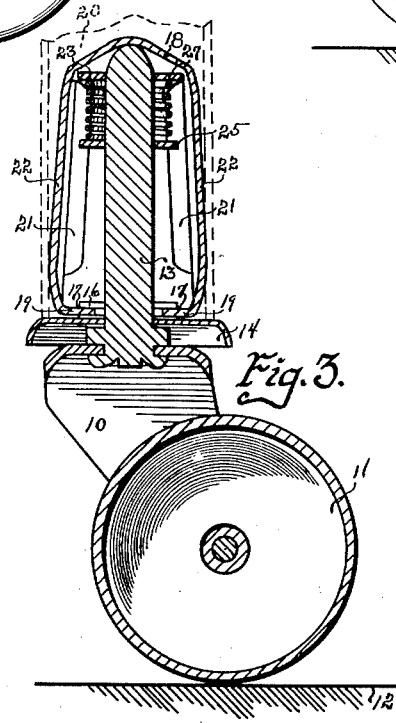
Inventor
~Edward~Schultz~
By M. Talbert Dick
Attorney Patented Apr. 15, 1930

1,754,576

UNITED STATES PATENT OFFICE

EDWARD SCHULTZ, OF CHICAGO, ILLINOIS, ASSIGNOR TO J. B. LADD, OF DES MOINES, IOWA

CASTER

Application filed September 14, 1928. Serial No. 305,980.

The principal object of my invention is to provide a swivel caster that is efficient in operation and noiseless in use even though the wheel portion of the device is not engaging a supporting surface and the load object to which the caster is secured is in a state of vibration.

A further object of this invention is to provide a caster that yieldingly supports up to a certain point the weight of the load object thereby obtaining the function of a shock absorbing action between the caster wheel and the member supported by the caster.

A still further object is to provide a swivel caster that will retain its relative position to the load object when the load object is moved to a point where the caster wheel is out of engagement with a supporting surface.

A still further object of my invention is to provide a caster, for use on load objects having a plurality of legs each designed to be supported by a caster, that automatically compensates for the uneven surface over and on which it operates, or differences in the lengths of the legs.

A still further object is to provide a caster that is economical in manufacture, durable in use, and refined in appearance.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side elevation of my caster secured to a hollow portion of a load object with the load object at such a height that the wheel of the caster is out of contact with a supporting surface.

Fig. 2 is a side elevation of the invention secured to a hollow portion of a load object to be supported with the wheel of the caster resting on a supporting surface.

Fig. 3 is a side sectional view of the caster supporting a load object and more fully illustrates its interior construction.

Fig. 4 is a cross-sectional view taken on line 4—4 of Fig. 2, and shows the method of securing the bridge centering plate in the spring yoke.

The casters now on the market for supporting load objects such as articles of furniture and the like having a plurality of legs are not entirely satisfactory, due to the fact that the surface upon which the casters move is not always level. When such a condition exists, one or more of the casters will not be in contact with the supporting surface and the load object will be in a state of unstable equilibrium. This undesired partial contact with the supporting surface is also realized when the legs of the load object are different in length. Another disadvantage of the ordinary caster is that when it is not engaging the supporting surface or only partially doing so, and the load object to which it is secured is vibrating, as in the case of washing machines, pianos, and the like, the caster will produce an undesired rattle. Such a condition also affects the tone of the piano.

I have overcome the above disadvantages as will be appreciated by those familiar with the art.

In the drawings the numeral 10 designates the caster wheel fork having the wheel 11 or other suitable surface engaging member such as a glide or like journaled therein and designed to engage a supporting surface 12. Secured to the fork 10 at one end by suitable means and rising therefrom is the pintle 13 having its upper end rounded, or cone-shaped. This pintle is circular in cross-section and may be any suitable length. The numeral 14 designates a bearing disk formed with a central circular aperture of somewhat greater diameter than the diameter of the pintle which it embraces. The position of this disk is in a horizontal plane above the top of the fork at which point it is allowed a certain amount of sliding movement on the pintle. The pintle is held against complete downward movement through the disk by burrs 15 formed on the pintle stem a certain distance above the fork and above the upper surface of the disk. If it is desired any other suitable means may be substituted for the burrs 15 for limiting the downward movement of the pintle and the means may be so designed as to permit the manual removal of the pintle from the disk when desired. The numeral 16 designates a central transverse raised boss on the bearing disk having diametrically opposed marginal slots 17. The spring yoke of the device is designated by the numeral 18 and is of general U-shape. This yoke is designed to embrace the pintle 13 and has its closed end resting on the upper end thereof and has a pivotal bearing thereon. In order to properly center on and conform to the rounded end of the pintle, the closed end of the yoke 18 is cupped. The free ends of the arms of the spring yoke are formed into inturned flanges 19 adapted to extend loosely within the slots 17 between the bearing disk and the boss thereof.

By this arrangement the disk 14 is supported by the yoke 18, which in turn is supported from the top of the pintle 13, and the flanges 19 are freely movable in the slots 17 as the arms of the spring yoke move inwardly in response to pressure or outwardly when pressure is relaxed. This action of the spring yoke is realized when the same is inserted in or withdrawn from the hollow portion of the load object having an inside diameter somewhat smaller than the outside diameter of the yoke, and by the yoke being of spring construction it will frictionally engage the inner wall of the hollow portion thereby yieldingly holding the caster from removal from the load object, or against accidental detachment therefrom. In the drawings the load object is shown in dotted lines and is designated by the numeral 20. When the caster is supporting the load object, the load object will be resting on the disk 14. Each arm of the spring yoke has formed on its side margins inturned flanges 21 extending from points near the upper ends to points near the inturned lower flanges 19. These side flanges serve to strengthen and prevent the breaking down of the yoke. The arms of the yoke are also formed with central longitudinally extending ribs 22 preferably arcuate or concavo-convex in cross-section which not only act to stiffen and reinforce the yoke, but conforms to the hollow portion of the load object. The numeral 23 designates a bridge or centering plate having a central aperture 24 of somewhat greater diameter than the diameter of the pintle which it slidably embraces, near the upper portion of the pintle. This bridge rests on the upper ends of the inturned flanges 21 and is supported thereby and confined between the flanges and the closed upper end of the yoke. Its form is preferably straight and plane on those margins within the arms of the yoke and curved on the margins between the arms as indicated in Fig. 4.

This bridge prevents buckling or distortion of the spring yoke under excessive strains in use, limits inward movement of the upper ends of the spring yoke, and prevents tipping of the pintle relative to the load object, thereby maintaining the caster in proper upright position. Embracing the pintle at a point between its two ends is a washer 25 as shown in the drawings. This washer is prevented from sliding completely downwardly on the pintle by burrs 26 formed on the pintle at a point near the center of its length and below the washer. Embracing the pintle, having one end engaging the under side of the bridge 23, and its other end engaging the upper side of the washer 25 is a coil spring 27. By such a construction the pintle carrying the yoke which has the wheel 11 will yieldingly be held by the coil spring, downwardly relative to the yoke 18, disk 14 and the load object, as shown in Fig. 1. The amount of downward movement of the pintle however will be limited by the burrs 15 as is also shown in Fig. 1. In other words the pintle is allowed a certain amount of reciprocation relative to the load object, but because of the coil spring 27 it will yieldingly be influenced to maintain a position as far out of the hollow portion of the load object as possible, thereby obtaining a spring or shock absorbing action between the load object and the supporting surface. When the wheel 11 is in contact with the supporting surface as shown in Fig. 2, and the weight of the load object is applied to the disk 14, the spring yoke carrying the bridge plate will be moved downwardly until the closed end of the yoke engages and bears on the top of the pintle, thereby compressing the coil spring 27, as the washer 25 is limited in one direction by the burrs 26. Any other means such as cotter-keys, spring rings or the like may be substituted for the burrs 26.

It should here be noted that when the device is secured to a load object and the wheel 11 is not engaging a supporting surface, the pintle will be fractionally held against swiveling action relative to the load object by the burrs 15 engaging the upper surface of the boss 16 on the disk 14. By this arrangement if the load object is traveling in a straight path the wheel 11 will be in proper position to resume its intended function when it next comes in contact with the supporting surface. Another advantage of this construction is that when the wheel is out of functioning engagement with the supporting surface, the pintle will be yieldingly held against rattling even though the load object is in a state of vibration. As soon as the wheel 11 engages a supporting surface and pressure is brought to bear on the disk 14, the burrs 15 will be removed from frictional engagement with the disk 14 and the caster may easily and readily swivel relative to the load object. If the surface over which the casters move is only slightly uneven, or the legs of the load object are only slightly different in their lengths, the wheels of the casters will be yieldingly held in functioning engagement with the supporting surface and the load object will be successfully supported. Also any shock experienced by the load object, or any one or all of the casters will be cushioned.

Some changes may be made in the construction and arrangement of my improved caster without departing from the real spirit and purpose of my invention and it is my intention to cover by my claims any modified forms of structure or use of mechanical equivalents which may be reasonably included within their scope.

I claim:

1. In a device of the class described, a surface engaging member having a pintle, a member rotatably and slidably mounted on said pintle, an engaging member secured to said loosely mounted member designed to frictionally engage the hollow portion of a load object, a stop on said pintle for limiting the movement of said rotatably and slidably mounted member on said pintle to one direction, and a coil spring functionally engaging said engaging member and said pintle for yieldingly holding said pintle in such a position that said stop will be in contact with said rotatably and slidably mounted member.

2. In a device of the class described, a surface engaging member having a pintle, a load object engaging member loosely and slidably mounted on said pintle, a spring for yieldingly holding said load object engaging member to one direction of its sliding movement on said pintle, a means for limiting the sliding movement of said engaging member to both directions independent of said spring; said limiting means being so positioned that a certain reciprocation of the pintle in the load object engaging member is possible.

3. In a device of the class described, a surface engaging member having a pintle, a load object engaging member loosely and slidably mounted on said pintle, a spring yoke embracing said pintle, secured to said engaging member, and having its closed end capable of engaging the top of said pintle when the same is slid in one direction in said load object engaging member, a stop member on said pintle for limiting the upward movement of the said load object engaging member, a bridge member loosely embracing the upper portion of said pintle and secured to said yoke, a washer loosely embracing the said pintle, a stop member on said pintle and below said washer for limiting its downward movement, and a coil spring embracing the pintle and engaging the said bridge member and said washer.

4. In a caster, the combination of a yoke having a cup bearing at its top, a pintle slidably mounted in the yoke, a stop device on the pintle to engage the yoke; said parts being so positioned and arranged that the pintle will be permitted to move up and down a limited distance, its upward movement being limited by engagement with the cup bearing and its downward movement by the engagement of the stop device with the yoke, and a compression spring engaging the pintle and the yoke and being of such character that it will be only partly compressed when the top of the pintle engages the cup bearing.

5. In a caster, the combination of a yoke member having a cup bearing at its top, a pointed pintle slidably mounted in said yoke, a stop means on said pintle to engage the said yoke; said parts being so arranged and positioned that the pintle will be permitted to move up and down a limited distance, by having its upward movement limited by engagement with the cup bearing and its downward movement by the yoke engaging said stop means, and a spring for holding the pintle top out of engagement with said cup bearing and so designed that it will only be partly compressed when the top of said pintle engages said cup bearing.

6. In a caster, the combination of a yoke having a bearing end at its top, a load supporting member secured to said yoke, a pintle slidably mounted in said yoke and supporting member, a stop means on the pintle for limiting the upward movement of said supporting member; said parts being so arranged and positioned that the pintle will be permitted to move up and down a limited distance, its upward movement being limited by engagement with the said bearing member and its downward movement by engagement of the stop means with the said supporting member, a second stop on said pintle, and a compression spring engaging last mentioned stop and said yoke for yieldingly holding said pintle out of engagement with same bearing end of such character that it will only partly be compressed when the top of the pintle engages said bearing.

7. In a caster, the combination of a yoke having a bearing at its top, a pintle slidably mounted in the yoke, a member rotatably and slidably mounted on said pintle and secured to said yoke, a stop on said pintle to engage said rotatably and slidably mounted member; said parts being so positioned and arranged that the pintle will be permitted to move up and down a limited distance, its upward movement being limited by engagement with the bearing and its downward movement by engagement of the stop with the rotatably and slidably mounted member, and a spring engaging the pintle and the yoke and being of such character that it will be only partially compressed when the top of the pintle engages the bearing.

EDWARD SCHULTZ.